United States Patent
Lee et al.

(10) Patent No.: US 10,336,314 B2
(45) Date of Patent: Jul. 2, 2019

(54) HYBRID POWERTRAIN SYSTEM

(71) Applicant: GM GLOBAL TECHNOLOGY OPERATIONS LLC, Detroit, MI (US)

(72) Inventors: Chunhao J. Lee, Troy, MI (US); Neeraj S. Shidore, Novi, MI (US); Norman K. Bucknor, Troy, MI (US); K V Hebbale, Troy, MI (US); Farzad Samie, Franklin, MI (US); Dongxu Li, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 182 days.

(21) Appl. No.: 15/660,589

(22) Filed: Jul. 26, 2017

(65) Prior Publication Data
US 2019/0031180 A1    Jan. 31, 2019

(51) Int. Cl.
*B60W 20/19* (2016.01)
*B60W 10/08* (2006.01)
(Continued)

(52) U.S. Cl.
CPC ............ *B60W 20/19* (2016.01); *B60K 6/383* (2013.01); *B60K 6/387* (2013.01); *B60K 6/40* (2013.01); *B60K 6/48* (2013.01); *B60W 10/02* (2013.01); *B60W 10/026* (2013.01); *B60W 10/06* (2013.01); *B60W 10/08* (2013.01);
(Continued)

(58) Field of Classification Search
CPC .... B60W 20/19; B60W 10/08; B60W 10/026; B60W 10/02; B60W 10/06; B60W 20/40; B60W 2710/0644; B60W 2540/10; B60W 30/09; B60W 2720/106; B60W 30/14; B60W 2510/0208; B60W 2510/0638; B60W 2710/0666; B60W 2710/021; B60W 2510/0283; B60W 2710/024; B60W 2710/083; B60W 2520/105; B60K 6/383; B60K 6/48; B60K 6/387; B60K 6/40; B60K 2006/4825; B60Y 2200/92;
(Continued)

(56) References Cited

U.S. PATENT DOCUMENTS 6,364,807 B1 *   4/2002   Koneda ................... B60K 6/48
                                                              477/5
6,441,506 B2 *   8/2002   Nakashima ............ B60K 6/365
                                                          123/179.1
(Continued)

*Primary Examiner* — Jaime Figueroa
(74) *Attorney, Agent, or Firm* — Quinn IP Law

(57) ABSTRACT

A low-voltage hybrid powertrain system for a vehicle includes an engine that is coupled via an engine disconnect clutch to an input member of the transmission, and a low-voltage electric machine is coupled to the transmission. The powertrain system operates in an electric vehicle (EV) mode with the engine in an OFF state and with the engine disconnect clutch in an open/deactivated state. When an output torque request indicates a command for vehicle acceleration, the electric machine is controlled to generate torque in response to the output torque request and the engine is simultaneously cranked and started. Upon starting, the engine operates in a speed control mode to activate the engine disconnect clutch. The engine and the low-voltage electric machine are controlled to generate torque in response to the output torque request when the engine disconnect clutch is activated.

19 Claims, 4 Drawing Sheets

(51) Int. Cl.
*B60K 6/383* (2007.10)
*B60W 20/40* (2016.01)
*B60W 10/02* (2006.01)
*B60W 10/06* (2006.01)
*B60K 6/48* (2007.10)
*B60K 6/40* (2007.10)
*B60K 6/387* (2007.10)
*B60W 30/14* (2006.01)
*B60W 30/09* (2012.01)

(52) U.S. Cl.
CPC ..... *B60W 20/40* (2013.01); *B60K 2006/4825* (2013.01); *B60W 30/09* (2013.01); *B60W 30/14* (2013.01); *B60W 2510/0208* (2013.01); *B60W 2510/0283* (2013.01); *B60W 2510/0638* (2013.01); *B60W 2520/105* (2013.01); *B60W 2540/10* (2013.01); *B60W 2710/021* (2013.01); *B60W 2710/024* (2013.01); *B60W 2710/0644* (2013.01); *B60W 2710/0666* (2013.01); *B60W 2710/083* (2013.01); *B60W 2720/106* (2013.01); *B60Y 2200/92* (2013.01); *Y10S 903/913* (2013.01); *Y10S 903/914* (2013.01); *Y10S 903/93* (2013.01); *Y10S 903/946* (2013.01); *Y10S 903/951* (2013.01)

(58) Field of Classification Search
CPC ............ Y10S 903/914; Y10S 903/946; Y10S 903/93; Y10S 903/913; Y10S 903/951

USPC ...................................................... 701/1, 22
See application file for complete search history.

(56) References Cited

U.S. PATENT DOCUMENTS

| | | | | |
|---|---|---|---|---|
| 6,746,366 | B2* | 6/2004 | Tamor | B60K 6/48 180/65.25 |
| 6,964,631 | B2* | 11/2005 | Moses | B60K 6/383 180/65.22 |
| 10,005,453 | B2* | 6/2018 | Kraska | B60W 20/40 |
| 2013/0292195 | A1* | 11/2013 | Gibson | B60K 6/48 180/53.1 |
| 2014/0024495 | A1* | 1/2014 | Kim | B60K 6/52 477/167 |
| 2014/0136038 | A1* | 5/2014 | Bissontz | B60W 50/0205 701/22 |
| 2014/0244119 | A1* | 8/2014 | McGrogan | B60W 10/06 701/54 |
| 2015/0065294 | A1* | 3/2015 | Borntrager | B60K 6/48 477/4 |
| 2015/0081154 | A1* | 3/2015 | Gibson | B60K 6/48 701/22 |
| 2016/0236561 | A1* | 8/2016 | Stache | B60K 6/28 |
| 2017/0232962 | A1* | 8/2017 | Yamauchi | B60L 50/16 701/22 |
| 2017/0282902 | A1* | 10/2017 | Kraska | B60W 20/40 |
| 2018/0050686 | A1* | 2/2018 | Atluri | B60K 6/387 |
| 2018/0093656 | A1* | 4/2018 | Yamazaki | B60W 20/13 |
| 2019/0016330 | A1* | 1/2019 | McCullough | B60W 20/40 |

* cited by examiner

HYBRID POWERTRAIN SYSTEM

BACKGROUND

Hybrid powertrain systems include internal combustion engines and electric motor/generators that are coupled to transmissions to transfer torque to a driveline for tractive effort. Electric motor/generators can deliver and/or be supplied electric power from energy storage systems. Powertrain systems may operate in various modes to generate and transfer propulsion power to vehicle wheels.

SUMMARY

A low-voltage hybrid powertrain system for a vehicle is described, including an engine, a torque converter, a low-voltage electric machine, a transmission and a controller. The engine is selectively coupled via an engine disconnect clutch to an input member of the transmission, and the low-voltage electric machine is rotatably coupled to the input member of the transmission, the torque converter is disposed between the engine and the input member of the transmission, and the transmission is coupled to a driveline of the vehicle. The controller is operatively connected to the powertrain system, and includes an instruction set that is executable to operate the powertrain system in an electric vehicle (EV) mode with the engine in an OFF state and with the engine disconnect clutch in an open/deactivated state. During operation, an output torque request is monitored. When the output torque request indicates a command for vehicle acceleration, the electric machine is controlled to generate torque in response to the output torque request and the engine is simultaneously cranked and started via a starting device. Upon starting, the engine operates in a speed control mode to activate the engine disconnect clutch. The engine and the low-voltage electric machine are controlled to generate torque in response to the output torque request when the engine disconnect clutch is activated.

An aspect of the disclosure includes the engine disconnect clutch being a one-way clutch, which includes the one-way clutch being a controllable one-way clutch.

Another aspect of the disclosure includes the low-voltage electric machine being an electric motor/generator that is electrically connected to a DC power source, wherein the DC power source is configured to operate at a voltage level that is less than 60V DC.

Another aspect of the disclosure includes the engine being coupled via the engine disconnect clutch to a pump portion of the torque converter.

Another aspect of the disclosure includes the engine disconnect clutch being a one-way clutch that is disposed between the engine and the torque converter, wherein the low-voltage electric machine is rotatably coupled to the input member of the transmission via the torque converter, and wherein the instruction set is executable to determine that the engine disconnect clutch is activated when engine speed matches an input speed to the torque converter.

Another aspect of the disclosure includes the electric machine being rotatably coupled via an off-axis mechanical drive system to the input member of the transmission.

Another aspect of the disclosure includes the engine disconnect clutch being a one-way clutch that is disposed between the torque converter and the input member of the transmission, wherein the low-voltage electric machine is rotatably coupled to the input member of the transmission via the torque converter, and wherein the instruction set is executable to determine that the engine disconnect clutch is activated when engine speed matches an input speed to the torque converter.

Another aspect of the disclosure includes the instruction set being executable to control torque commands for the engine and the electric machine to generate torque in response to the output torque request.

Another aspect of the disclosure includes the instruction set being executable to monitor an operator input to an accelerator pedal to determine the output torque request.

Another aspect of the disclosure includes the instruction set being executable to monitor one of an adaptive cruise control system and an autonomous braking/collision avoidance system to determine the output torque request.

Another aspect of the disclosure includes the instruction set being executable to operate the powertrain system in the electric vehicle mode with the engine in the OFF state and with the engine disconnect clutch in the deactivated state only when the low-voltage electric machine has a mechanical power capacity that achieves an acceleration level that is greater than a desired acceleration threshold.

Another aspect of the disclosure includes a method for controlling operation of a low-voltage hybrid powertrain system for a vehicle, wherein the low-voltage hybrid powertrain system includes an engine that is selectively coupled via an engine disconnect clutch to an input member of a transmission and wherein the low-voltage electric machine is rotatably coupled to the input member of the transmission. The method include operating the powertrain system in an electric vehicle (EV) mode with the engine in an OFF state and with the engine disconnect clutch in a deactivated state and monitoring an output torque request. When the output torque request indicates a command for vehicle acceleration, the method includes controlling the low-voltage electric machine to generate torque that is transferred to the input member of the transmission in response to the output torque request, and simultaneously cranking and starting the engine and operating the engine in a speed control mode to activate the engine disconnect clutch. Upon determining that the engine disconnect clutch is activated, the engine and the low-voltage electric machine are controlled to generate torque in response to the output torque request.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
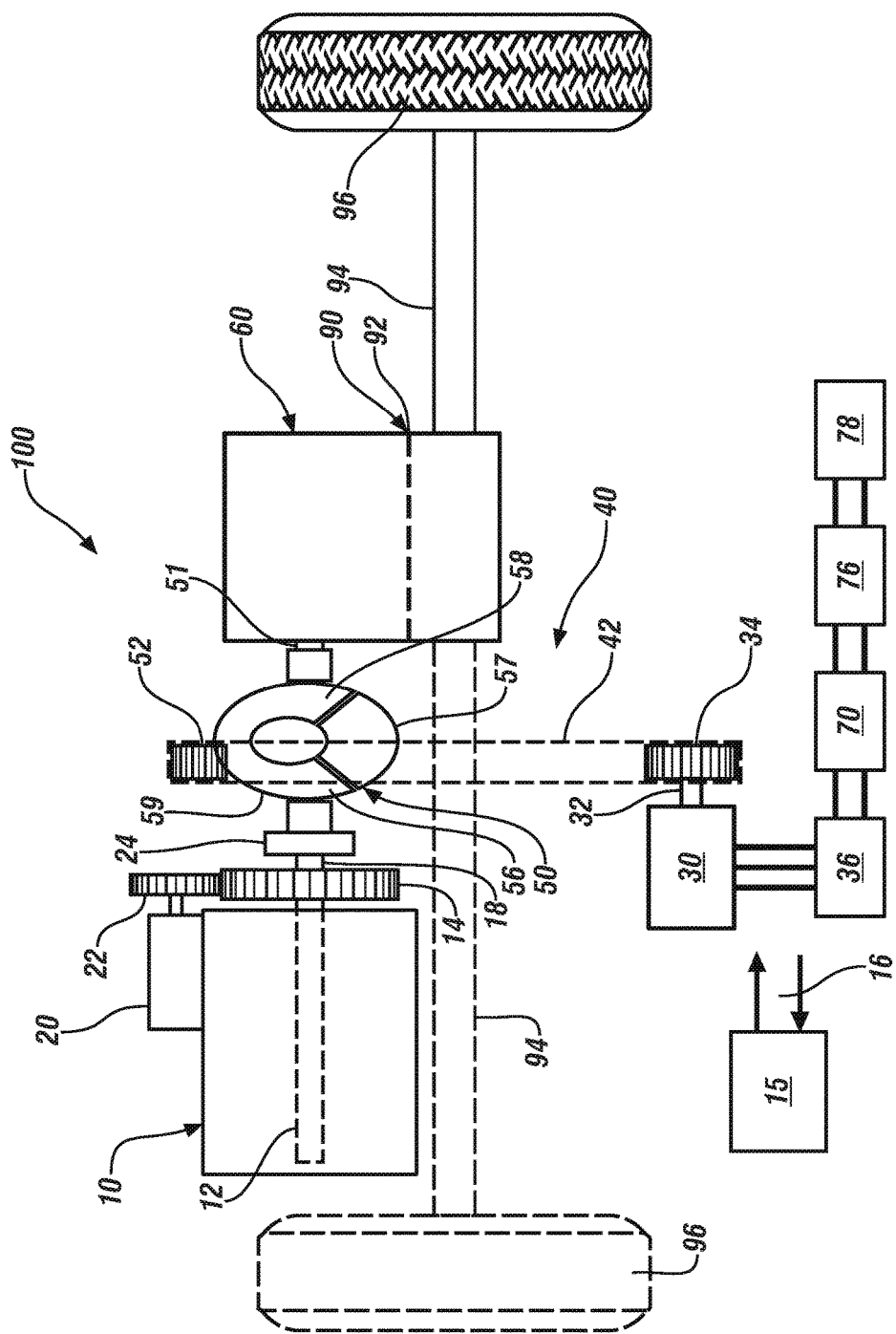
FIG. 1 schematically illustrates a low-voltage hybrid powertrain system that includes an internal combustion engine that is coupled to a transmission via an engine disconnect clutch and a torque converter, and an electrically-powered torque machine that is coupled to the transmission via an off-axis mechanical drive system, in accordance with the disclosure.

Referring now to the drawings, wherein the showings are for the purpose of illustrating certain exemplary embodiments only and not for the purpose of limiting the same, FIG. 1 schematically shows an embodiment of a low-voltage hybrid powertrain system (powertrain system) 100 including multiple torque-generating devices that are capable of generating and transferring torque via a transmission 60 to a driveline 90. The torque-generating devices include an internal combustion engine (engine) 10 and at least one electrically-powered low-voltage motor/generator (electric machine) 30. The engine 10 and electric machine 30 are mechanically coupled via an engine disconnect clutch 24, a torque converter 50 and an off-axis mechanical drive system 40 to the transmission 60 to transfer propulsion power to vehicle wheels 96 via the driveline 90. The concepts described herein may apply to powertrain configurations that include the engine 10 and the electric machine 30 disposed to transfer propulsion power to vehicle wheels 96 wherein the engine 10 can be selectively decoupled from the transmission 60. Like numerals refer to like elements throughout the description. Operation of the powertrain system 100 may be controlled by a controller 15, which is shown as a unitary device for ease of illustration. The powertrain system 100 may be advantageously employed on a vehicle to provide propulsion power, and the vehicle may include, by way of non-limiting examples, a passenger vehicle, a light-duty or heavy-duty truck, a utility vehicle, an agricultural vehicle, an industrial/warehouse vehicle, a recreational off-road vehicle, aircraft, watercraft, train, all-terrain vehicle, personal movement apparatus, robot and the like to accomplish the purposes of this disclosure.

The powertrain system 100 is configured so that the engine 10 and the electric machine 30 are able to mechanically couple to the transmission 60 employing engine disconnect clutch 24, the torque converter 50 and the off-axis mechanical drive system 40. This enables the powertrain system 100 to be configured in a front-wheel drive arrangement and operate in one of multiple selectable modes, including an engine-only drive mode, an electric-only (EV) drive mode, a regenerative braking mode, and an engine/electric-assist mode. Alternatively, the powertrain system 100 can be configured in a rear-wheel drive arrangement or an all-wheel drive arrangement and be operable in one of the multiple selectable modes. The configuration of the powertrain system 100 enables engine stop/start operations during powertrain system operation. The powertrain system 100 described herein advantageously employs the torque converter 50, which results in improved drivability during vehicle acceleration modes, transmission shifting modes and vehicle deceleration modes. Furthermore, the off-axis mechanical drive system 40 is configured to spin the electric machine 30 at a fixed speed ratio with regard to the engine speed, thereby eliminating need for an alternator to effect charging of a low-voltage battery 78. Furthermore, there is no need for an auxiliary electrically-powered hydraulic pump for the transmission 60 since the electric machine 30 is configured to and can be controlled to spin the torque converter 50 when the engine 10 is in an OFF state. The engine disconnect clutch 24 is disposed between the engine 10 and the transmission 60, which facilitates operation in the EV drive mode, the regenerative braking mode and an off-throttle vehicle sailing mode. In one embodiment, the engine disconnect clutch 24 is disposed between the engine 10 and the torque converter 50, and may be integrated into the housing of the torque converter 50.

In the engine-only drive mode, the engine 10 is controlled to generate propulsion power while the electric machine 30 freewheels. This mode may be commanded during vehicle acceleration or steady-state running modes. In the EV drive mode, the electric machine 30 is controlled as a motor to generate propulsion power, while the engine 10 is in the OFF state and disconnected by deactivating the engine disconnect clutch 24. This mode may be commanded during idle, vehicle acceleration or steady-state running modes. In the regenerative mode, the electric machine 30 is controlled as a generator to react driveline torque and generate electric power, while the engine 10 is either at idle or in the OFF state and disconnected by deactivating the engine disconnect clutch 24. This mode may be commanded during coasting and vehicle braking. In the engine/electric-assist drive mode, the engine 10 and the electric machine 30 are controlled to generate propulsion power. This mode may be commanded during vehicle acceleration or steady-state running modes.

The engine 10 is configured as a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force onto pistons, with such force transferred to a crankshaft 12 to produce torque. The engine 10 includes an on-engine starting device 20 that includes a starter switch and a starter gear 22, wherein the starter gear 22 meshingly engages gear teeth that are disposed on an outer circumference of a flywheel 14 that is coupled to the crankshaft 12 in one embodiment. The starting device 20 can be configured, in one embodiment, as a single-phase electric motor including an output shaft that couples to the starter gear 22, wherein the single-phase electric motor is electrically connected to the low-voltage battery 78 via activation of the starter switch. In one embodiment, the starter gear 22 is permanently meshingly engaged with the flywheel 14. Alternatively, the starting device 20 can be another suitable configuration that includes a device and/or controller that is arranged to transfer torque to spin the crankshaft 12. The flywheel 14 also couples to an input member 18 that is coupled via the engine disconnect clutch 24 to a pump 56 of the torque converter 50. In one embodiment, the engine disconnect clutch 24 is a one-way clutch. In one embodiment, the one-way clutch is a selectable one-way clutch. Alternatively, the engine disconnect clutch 24 is configured as a hydraulic-actuated multi-plate friction clutch. Operation of the engine 10 including operation of the starting device 20 is controlled by an engine controller, which may be integrated into or physically separated from the controller 15.

The engine 10 is mechanized with suitable hardware and the engine controller can include suitable control routines to execute autostart and autostop functions, fueled and fuel cutoff (FCO) functions, and all-cylinder and cylinder deactivation functions during ongoing operation of the powertrain 100. The engine 10 is considered to be in an OFF state when it is not rotating. The engine 10 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and operating with engine exhaust valves in open states to minimize pumping losses, while the remaining cylinders are fueled and fired and thus producing torque. The ON state may include the FCO state in which the engine 10 is spinning and unfueled. The ON state may include the cylinder deactivation state. The ON state may include the FCO state in combination with the cylinder deactivation state. Engine mechanizations and control routines for executing autostart, autostop, FCO and cylinder deactivation control routines are known and not described herein. Engine operation may be described in context of engine states, including an engine operation state, an engine fueling state and an engine cylinder state. The engine operation states includes the ON and OFF states. The engine fueling states include the fueled state and the FCO state. The engine cylinder states include the all-cylinder state and the cylinder deactivation state.

The electric machine 30 can be a multi-phase electric motor/generator that is configured to convert stored electric energy to mechanical power for tractive effort and is also configured to convert mechanical power to electric energy that may be stored in a low-voltage DC power source (LV battery) 70. The electric machine 30 is configured as a 15 kW device in one embodiment, and the LV battery 70 is configured to operate at a voltage level that is less than 60 V DC, and is set at a nominal 48V DC voltage level in one embodiment. The electric machine 30 includes a rotor and a stator, and electrically connects via the inverter module 36 to the LV battery 70. The rotor couples to a rotatable member 32 that couples to a motor pulley 34 that is an element of the off-axis mechanical drive system 40.

The torque converter 50 is a fluidic torque coupling device arranged between the input member 18 of the engine 10 and an input member 51 of the transmission 60. The torque converter 50 includes the pump 56 rotatably coupled to the crankshaft 12, a stator 57, a turbine 58 rotatably coupled to the input member 51 to the transmission 60, and a controllable clutch 59. The torque converter 50 operates to provide fluid torque coupling between the pump 56 and the turbine 58 when the clutch 59 is deactivated or released, and provides mechanical torque coupling between the pump 56 and the turbine 58 when the clutch 59 is activated. Other details related to design of torque converters and torque converter clutches are known and not described in detail herein. The pump 56 is coupled to an outer pulley 52, which may be disposed on an outer circumference of the pump 56. Alternatively, the outer pulley 52 may be arranged on a separate pulley that is fixedly attached to the pump 56 to rotate therewith, with an outer circumference that is substantially equal an outer circumference of the pump 56 and is co-axial therewith.

The off-axis mechanical drive system 40 includes, in one embodiment, the outer pulley 52 coupled to the pump 56 of the torque converter 50, the motor pulley 34 coupled to the rotor of the electric machine 30, and a continuous belt 42. The outer pulley 52 and the motor pulley 34 are rotatably coupled via the continuous belt 42 to transfer torque therebetween. The outer pulley 52 and the motor pulley 34 may be suitably configured with belt contact surfaces that are in the form of a single circumferential groove, multiple circumferential grooves, radial teeth, or another suitable arrangement, and the continuous belt 42 is configured in accordance with the belt contact surfaces of the outer pulley 52 and the motor pulley 34. In one embodiment, the off-axis mechanical drive system 40 includes a belt tensioner to ensure that the continuous belt 42 makes contact with at least 180° of the belt contact surfaces of the outer pulley 52 and the motor pulley 34. The continuous belt 42 may be fabricated from Kevlar cords in one embodiment. In one embodiment, the pulley ratio between the outer pulley 52 and the motor pulley 34 is 2.5:1. Alternatively, the outer pulley 52 and the motor pulley 34 are rotatably coupled via a continuous chain to transfer torque therebetween. Alternatively, the outer pulley 52 and the motor pulley 34 are rotatably coupled via meshed gears to transfer torque therebetween.

The transmission 60 is a torque transfer device that includes, in one embodiment, a step-gear configuration composed of one or multiple differential gear sets and activatable clutches that are configured to effect torque transfer in one of a plurality of fixed gear states over a range of speed ratios between the engine 10, the input member 51 and the output member 62. In one non-limiting embodiment, the transmission 60 is configured as a nine-speed fixed-gear transmission. The transmission 60 may include a first rotational speed sensor in the form of a Hall-effect sensor or another suitable sensor that may be configured to monitor rotational speed of the input member 51 and/or a second rotational speed sensor that may be configured to monitor rotational speed of the output member 62. The transmission 60 includes an automatic transmission that automatically shifts between the fixed gear states to operate at a gear ratio that achieves a desired match between an output torque request and an engine operating point. The transmission 60 automatically executes upshifts to shift to a gear state having a lower numerical multiplication ratio (gear ratio) at preset speed/load points and executes downshifts to shift to a gear state having a higher numerical multiplication ratio at preset speed/load points. The transmission 60 may be controlled using a controllable hydraulic circuit that communicates with a transmission controller, which may be integrated into or separate from the controller 15. The transmission controller controls the torque converter clutch 59 in one embodiment. The transmission 60 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Transmission operation may be described in context of a control variable that may be communicated to the transmission 60 that is related to a selected fixed gear state. Alternatively, the transmission 60 may be a continuously-variable transmission device.

The driveline 90 may include a differential gear device 92 that mechanically couples to axle(s) 94 that mechanically couples to wheel(s) 96 in one embodiment. The driveline 90 transfers tractive power between an output member of the transmission 60 and a road surface via the wheel(s) 96.

The inverter module 36 is configured with suitable control circuits including power transistors, e.g., integrated gate bipolar transistors (IGBTs) for transforming DC electric power to AC electric power and transforming AC electric power to DC electric power. The inverter module 36 may employ pulsewidth-modulating (PWM) control of the IGBTs to convert stored DC electric power originating in the LV battery 70 to AC electric power to drive the electric machine 30 to generate torque. Similarly, the inverter module 36 converts mechanical power transferred to the electric machine 30 to DC electric power to generate electric energy that is storable in the LV battery 70, including as part of a regenerative braking control strategy. The inverter module 36 receives motor control commands from the controller 15 and controls inverter states to provide a desired motor drive operation or a regenerative braking operation. In one embodiment, an auxiliary DC/DC electric power converter 76 electrically connects to the bus and provides electric power to charge the low-voltage battery 78 via a low-voltage bus. The low-voltage battery 78 provides low-voltage electric power to low-voltage systems on the powertrain system 100 and the vehicle, including, e.g., the starting device 20, electric windows, HVAC fans, seats, and other devices. In one embodiment the low-voltage battery 78 is configured to operate at a nominal 12V DC voltage level.

The LV battery 70 is disposed to supply electric power at a nominal voltage level of 48 V DC, and may be a DC power source, e.g., a multi-cell lithium ion device, an ultra-capacitor, or another suitable device without limitation. Monitored parameters related to the LV battery 70 may include a state of charge (SOC), temperature, and others. In one embodiment, the LV battery 70 may electrically connect via an on-vehicle battery charger to a remote, off-vehicle electric power source for charging while the vehicle is stationary.

The controller 15 may signally connect to an operator interface (not shown) and provides hierarchical control of a plurality of control devices to effect operational control of individual elements of the powertrain 100, including, e.g., the inverter module 36, the engine controller and the transmission controller. The controller 15 communicates with each of the inverter module 36, the engine controller and the transmission controller, either directly or via a communication bus 16 to monitor operation and control operations thereof.

The terms controller, control module, module, control, control unit, processor and similar terms refer to various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Vehicle operation includes operation in response to desired commands, which can include operator requests and/or autonomous vehicle requests. Such operation includes operating modes of acceleration, braking, steady-state running, coasting, and idling. Operator requests can be generated based upon operator inputs to an accelerator pedal, a brake pedal, a transmission range selector, and a cruise control system. Autonomous vehicle requests may be generated by an adaptive cruise control system, an autonomous braking/collision avoidance system and/or other systems that are configured to command and control autonomous vehicle operation separate from or in conjunction with the operator requests. The acceleration mode includes a tip-in event, which is a request to increase vehicle speed, i.e., accelerate the vehicle. A tip-in event can originate as an operator request for acceleration or as an autonomous vehicle request for acceleration. One non-limiting example of an autonomous vehicle request for acceleration can occur when a sensor for an adaptive cruise control system indicates that a vehicle can achieve a desired vehicle speed because an obstruction has been removed from a lane of travel, such as may occur when a slow-moving vehicle exits from a highway. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag, or drag torque. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero.

Figure 2:
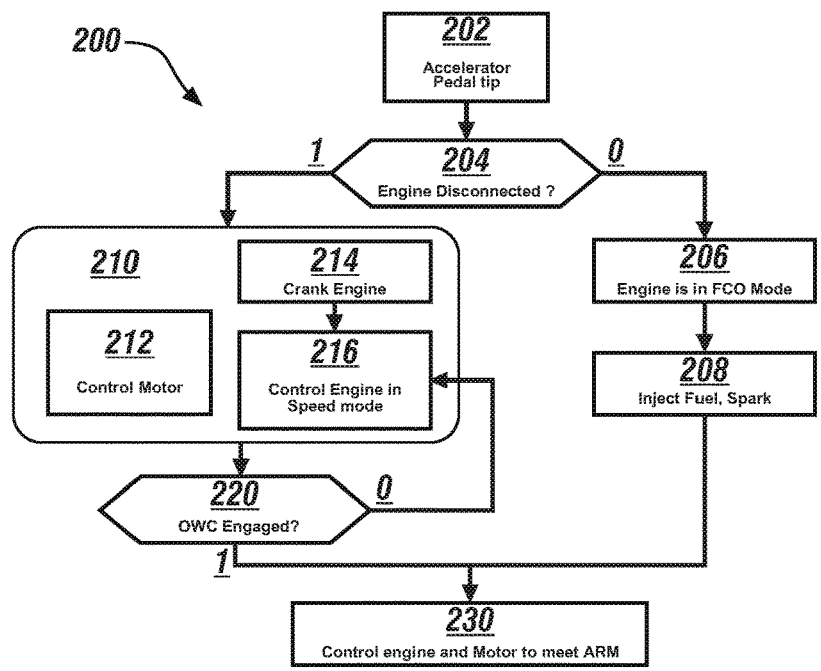
FIG. 2 schematically shows a routine for controlling operation of an embodiment of the low-voltage hybrid powertrain system of FIG. 1 in response to an output torque request when operating with the engine in an OFF state with the engine disconnect clutch in a deactivated state, in accordance with the disclosure.

FIG. 2 schematically shows a routine 200 for controlling operation of an embodiment of the powertrain system 100 described with reference to FIG. 1 in response to an output torque request that includes a tip-in event when operating in the EV mode that includes the engine 10 being in an OFF state and the engine disconnect clutch 24 being in a deactivated state. The routine 200 is exhibited as a flowchart, and Table 1 is provided as a key wherein the numerically labeled blocks and the corresponding functions are set forth as follows, corresponding to the routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
| --- | --- |
| 202 | Detect tip-in event when operating in EV mode |
| 204 | Is engine disconnected? |
| 206 | Operating in FCO mode |
| 208 | Initiate engine fueling, spark control |
| 210 | Execute crank/run and torque control |
| 212 | Control operation of electric machine |
| 214 | Execute engine crank/run operation |
| 216 | Control engine in speed mode |
| 220 | Is engine disconnect clutch activated? |
| 230 | Operate engine, electric machine in engine/electric-assist drive mode in response to the tip-in |

Execution of the routine 200 may proceed as follows. The steps of the routine 200 may be executed in a suitable order, and are not limited to the order described with reference to FIG. 2.

The vehicle may be operating in one of a plurality of vehicle modes in response to an output torque request and/or an input from an autonomous control system, including e.g., acceleration, braking, steady-state running, coasting, and idling modes.

The powertrain system 100 can operate in the electric vehicle (EV) mode with the engine 10 in the OFF state and with the engine disconnect clutch 24 in the deactivated state only when the low-voltage electric machine 30 has a mechanical power capacity that achieves an acceleration level that is greater than a minimum threshold of acceleration. This is described with reference to FIG. 5.

When the powertrain system 100 is operating in the EV mode, the routine 200 can execute, which includes monitoring an output torque request to detect a tip-in event. When a tip-in event is detected (202), the routine 200 determines whether the engine 10 has been disconnected (204), which includes determining whether the engine disconnect clutch 24 has been deactivated. When the engine disconnect clutch 24 has not been deactivated (204)(0), the routine 200 determines that the engine 10 is operating in the FCO mode (206), and engine fueling and spark control are initiated (208) to effect operation in the vehicle acceleration mode, including operating in the engine/electric-assist drive mode (230).

When the engine disconnect clutch 24 has been deactivated (204)(1), the routine 200 simultaneously executes engine crank/run and torque control operations (210). This includes immediately controlling operation of the electric machine 30 to generate driveline torque in response to the operator request for acceleration and/or the autonomous vehicle request for acceleration (212). Power flow to the electric machine 30 is controlled such that the torque output from the electric machine translates to a desired acceleration level at the driveline 90. This operation presupposes a determination that the powertrain system 100 is capable of delivering a sufficient amount of torque to the driveline 90, as is described with reference to FIG. 5.

Simultaneous with controlling operation of the electric machine 30 to generate driveline torque, engine starting is initiated by cranking the engine 10, via the starting device 20, with accompanying fueling and firing (214). When the engine 10 starts, e.g., as indicated by engine speed flaring or a signal input from the engine controller, it is operated in a speed control mode such that engine operation is controlled to achieve a commanded engine speed (216). This includes commanding engine operation to control engine speed to match the driveline speeds to effect activation of the engine disconnect clutch 24. When the engine disconnect clutch 24 is a one-way clutch or a selectable one-way clutch, activation of the engine disconnect clutch 24 occurs without further control action when the speeds of the clutch elements are synchronized. When the engine disconnect clutch 24 is a friction clutch, e.g., a multi-plate clutch, activation occurs by a control action that includes a clutch activation command when the speeds of the clutch elements are synchronized. The engine disconnect clutch 24 is monitored to detect when it has been activated, which can include monitoring rotational speeds of the clutch elements (220). When the engine disconnect clutch 24 has not been activated (220)(0), the engine is operated in the speed control mode to achieve the commanded engine speed (216). This occurs in conjunction with controlling operation of the electric machine 30 to generate torque in response to the operator request for acceleration and/or the autonomous vehicle request for acceleration (212). When the engine disconnect clutch 24 is activated, operation of the engine 10 in the speed control mode is discontinued (220)(1). Instead, operations of the engine 10 and the electric machine 30 are controlled in the engine/electric-assist drive mode to work together to generate torque that is responsive to the output torque request (230), and this iteration of the routine 200 ends.

As such, the routine 200 advantageously operates the low-voltage hybrid powertrain system 100 in response to a sudden tip-in event under conditions when the engine 10 is in the OFF state. The routine 200 includes generating torque via the electric machine 30, which can be transferred through the transmission 60 and driveline 90 to the vehicle wheels 96 for tractive effort and vehicle acceleration. The tractive effort and vehicle acceleration are provided by the powertrain system 100 without first starting the engine 10 and without displacing mechanical power generated by the electric machine 20 to start the engine 10, thus improving drivability and customer perceptions.

Figure 3:
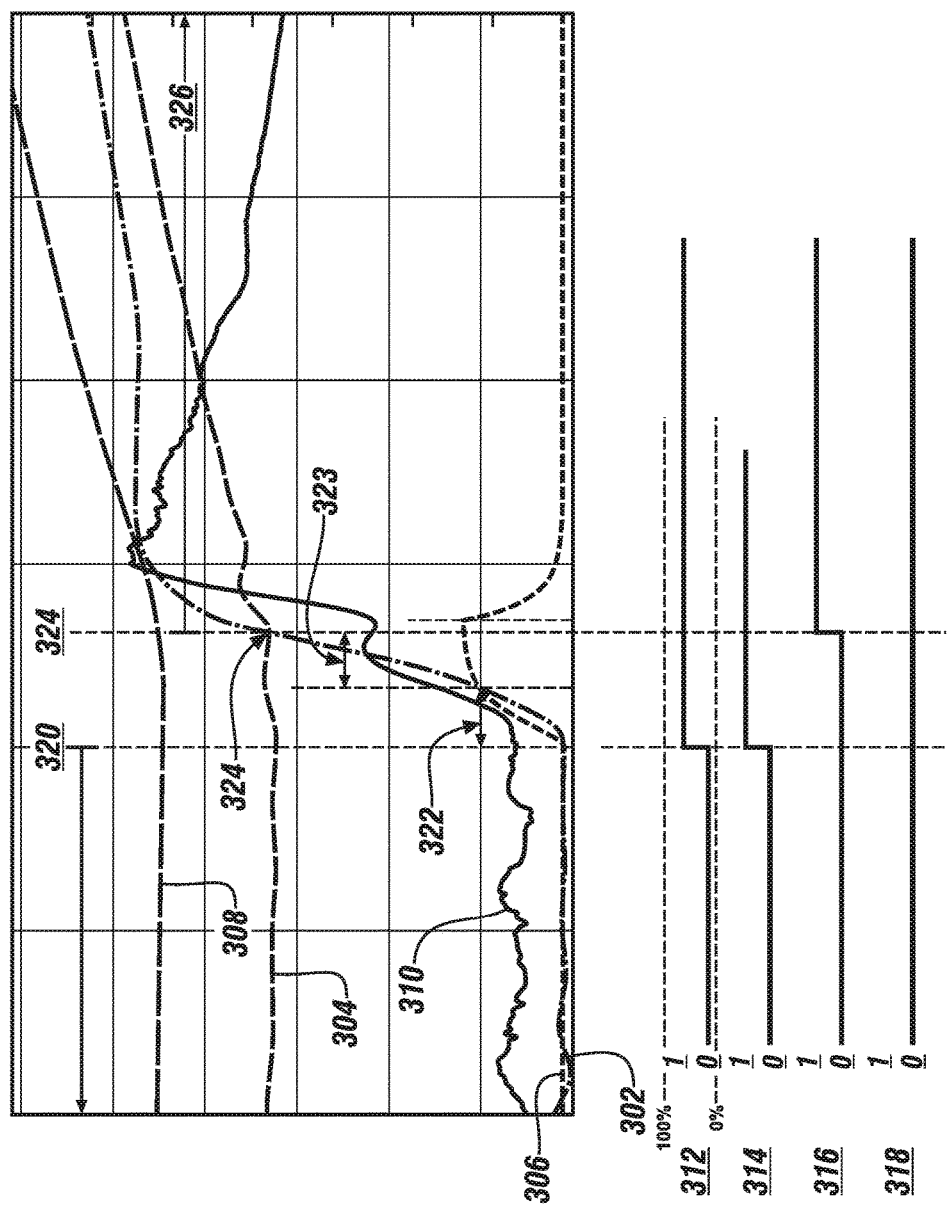
FIG. 3 graphically shows a plurality of actuator commands and operating parameters associated with operation of a vehicle including an embodiment of the low-voltage hybrid powertrain system described with reference to FIG. 1, wherein the engine disconnect clutch is disposed between the internal combustion engine and the torque converter, in accordance with the disclosure.

FIG. 3 graphically shows a plurality of actuator commands and vehicle operating parameters associated with operation of an embodiment of the vehicle and powertrain system 10 described with reference to FIG. 1, operating in response to an embodiment of the routine 200 described with reference to FIG. 2. In this embodiment the engine disconnect clutch 24 is disposed between the internal combustion engine 10 and the pump 56 of the torque converter 50. The vehicle operating parameters include engine speed 302, transmission input speed 304, electric machine torque 306, vehicle speed 308 and vehicle acceleration 310. The actuator commands include an acceleration request 312, an engine crank/run state 314, an engine disconnect clutch activation state 316, and a torque converter clutch activation state 318. Each of these parameters are coincidently plotted in relation to time, which is indicated on the horizontal axis.

Prior to timepoint 320, the acceleration request 312 is at a low level, the engine is in an OFF state, and the engine crank/run state 314 is OFF (0), the engine disconnect clutch activation state 316 is deactivated or OFF (0), and the torque converter clutch activation state 318 is OPEN (0).

At timepoint 320, the acceleration request 312 increases in response to a tip-in event, which triggers the engine crank/run state 314 to transition to the ON (1) state. Initially, the electric machine torque 306 increases, which causes an increase in the vehicle acceleration 310, which leads to an increase in the vehicle speed 308. Simultaneously, the engine speed 302 increases, as indicated by the period identified by element 322. The engine transitions to a run operation, and operates in engine speed control mode during the period indicated by element 323. At point 324, the engine speed 302 is synchronized with the transmission input speed 304, and the engine disconnect clutch is activated, i.e., the engine disconnect clutch activation state 316 transitions to ON (1). When the engine disconnect clutch is configured as an OWC or a SOWC, its activation occurs when the engine speed 302 is synchronized with the transmission input speed 304 without further control action. When the engine disconnect clutch is configured as a friction clutch, the controller commands clutch activation when the engine speed 302 is synchronized with the transmission input speed 304. At this point, the engine and the electric machine work together to generate torque in response to the acceleration request 312, as indicated by element 326.

When operating in the EV mode, the torque converter clutch activation state 318 can be locked, i.e., the torque converter clutch activation state 318 can be closed prior to the tip-in event at timepoint 320, and can remain locked during the entire operation.

Figure 4:
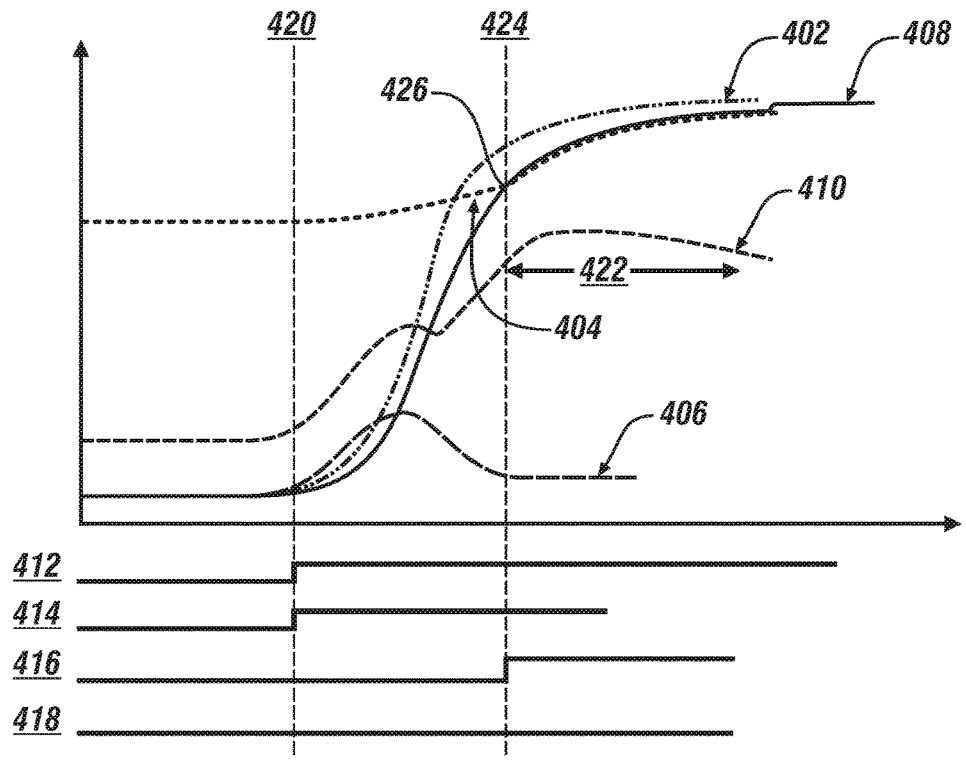
FIG. 4 graphically shows a plurality of actuator commands and operating parameters associated with operation of a vehicle including an embodiment of the low-voltage hybrid powertrain system described with reference to FIG. 1, wherein the engine disconnect clutch is disposed between the torque converter and the transmission, in accordance with the disclosure.

FIG. 4 graphically shows a plurality of actuator commands and vehicle operating parameters associated with operation of an embodiment of the vehicle including an alternate embodiment of the powertrain system 100 described with reference to FIG. 1, operating in response to an embodiment of the routine 200 described with reference to FIG. 2. In this embodiment the engine disconnect clutch 24 is disposed between the turbine 58 of the torque converter 50 and the input member 51 of the transmission 60, and the low-voltage electric machine is rotatably coupled to the input member 51 of the transmission 60. The vehicle operating parameters include engine speed 402, transmission input speed 404, electric machine torque 406, torque converter turbine speed 408 and vehicle acceleration 410. The actuator commands include an acceleration request 412, an engine crank/run state 414, an engine disconnect clutch activation state 416, and a torque converter clutch activation state 418. Each of these parameters are coincidently plotted in relation to time, which is indicated on the horizontal axis.

Prior to timepoint 420, the acceleration request 412 is at a low level, the engine is in an OFF state, and the engine crank/run state 414 is OFF (0), the engine disconnect clutch activation state 416 is OFF (0), and the torque converter clutch activation state 418 is OPEN (0).

At timepoint 420, the acceleration request 412 increases in response to a tip-in event, which triggers the engine crank/run state 414 to transition to the ON (1) state. Initially, the electric machine torque 406 increases, which causes an increase in the vehicle acceleration 410, which leads to an increase in the turbine speed 408. Simultaneously, the engine speed 402 increases, as indicated by the period identified by element 422. The engine transitions to a run operation, and operates in engine speed control mode. At point 424, the turbine speed 408 is synchronized with the transmission input speed 404, and the engine disconnect clutch is activated, i.e., the engine disconnect clutch activation state 416 transitions to ON (1). When the engine disconnect clutch is configured as an OWC or a SOWC, its activation occurs when the turbine speed 408 is synchronized with the transmission input speed 404 without a control action. When the engine disconnect clutch is configured as a friction clutch, the controller commands clutch activation when the turbine speed 408 is synchronized with the transmission input speed 404. From this point forward, the engine and the electric machine work together to generate torque in response to the acceleration request 412, as indicated by element 426.

By controlling and operating the powertrain system 10 in accordance with the concepts described herein, a decision to deactivate the engine disconnect clutch 24 and thus disconnect the engine 10 from the remaining portions of the powertrain system 100 can be made based upon drive quality, limited by available torque from the electric machine 20. This enables execution of an engine autostop operation to place the engine 10 in the OFF state, so long as the powertrain system 100 has the capacity to generate a sufficient magnitude of torque in response to an engine tip-in event, as described with reference to FIG. 5. Furthermore, deactivating the engine disconnect clutch 24 and thus disconnecting the engine 10 from the remaining portions of the powertrain system 100 can lead to an opportunity for additional energy recovery via the electric machine 20 during regenerative braking because there is no longer a drag torque contribution imposed by the engine 10 during such braking events.

Furthermore, deactivating the engine disconnect clutch 24 and thus disconnecting the engine 10 from the remaining portions of the powertrain system 100 can facilitate operation in the EV mode at low speed and/or low load conditions.

Furthermore, the controller 15 can execute engine speed control routines to cause the engine speed to match the driveline speed before activating the engine disconnect clutch 24. A smooth tip-in response can be accomplished by controlling operation of the electric machine 20, without a time delay caused by execution of an engine autostart routine. The controller 15 can delay or eliminate the need to execute a transmission downshift after the tip-in event.

Such operation also facilitates disconnecting the engine 10 by deactivating the engine disconnect clutch 24 during braking events, thus enabling regenerative braking operation and recapturing of energy in the form of electric power.

The powertrain system 100 includes the electric machine 30 and LV battery 70, which are configured to provide mechanical power for vehicle propulsion under certain operating conditions, including vehicle launch and low-speed operations in the EV mode or the engine/electric-assist mode to effect the selected vehicle operating mode of acceleration, low-speed steady-state running, coasting, or idling. The electric machine 30 has a maximum mechanical power capability, which can be expressed in terms of a maximum rotational speed and a peak motor torque.

Figure 5:
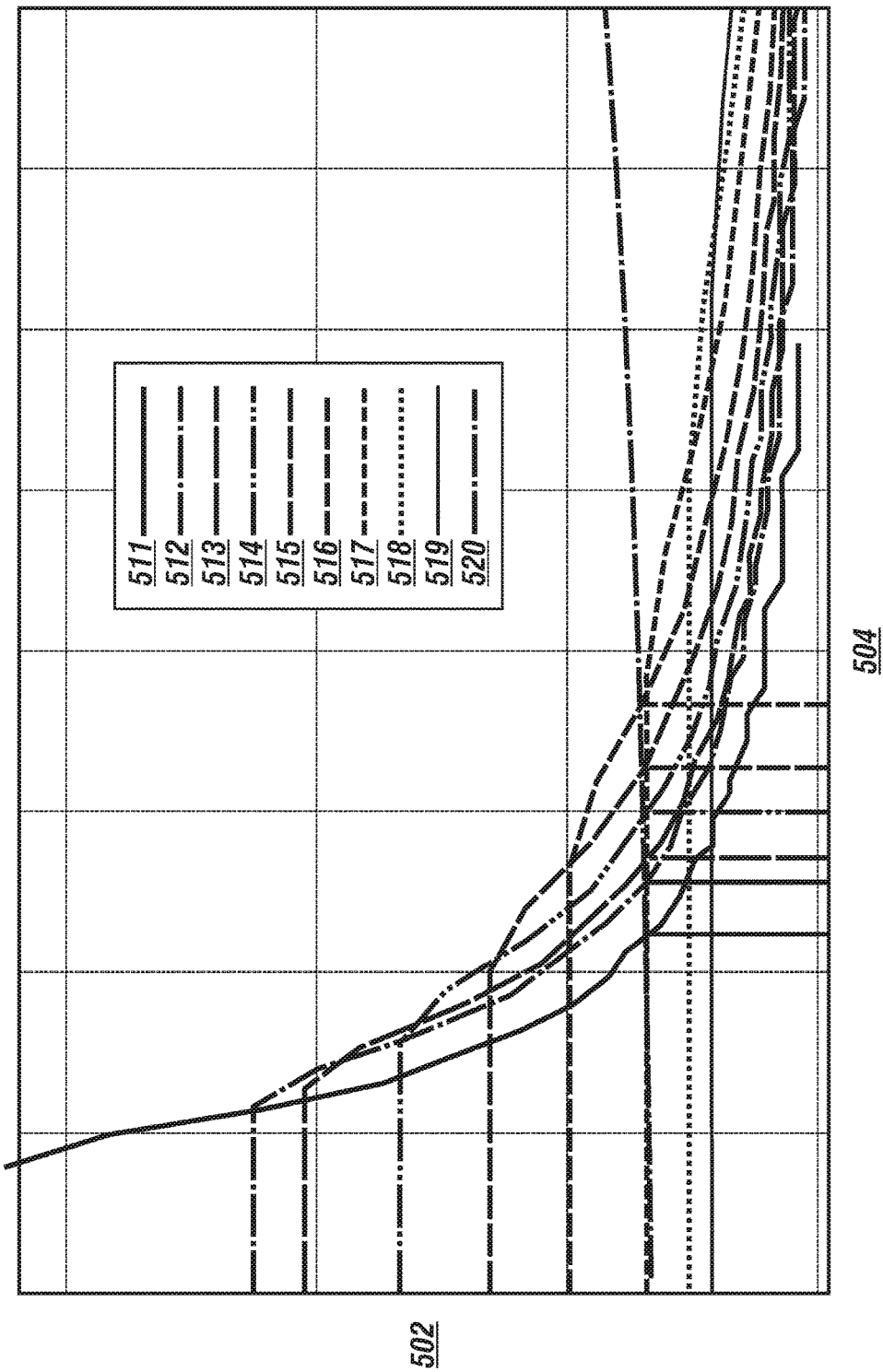
FIG. 5 graphically shows a plurality of curves representing peak motor torque (Nm) delivered to an axle of a vehicle driveline in relation to vehicle speed (kph) for an embodiment of the low-voltage hybrid powertrain system, in accordance with the disclosure.

FIG. 5 graphically shows a plurality of curves representing peak motor torque (Nm) on the vertical axis 502, in relation to vehicle speed (kph), on the horizontal axis 504, and associated with operation of an embodiment of the low-voltage hybrid powertrain system 100 including the engine 10 and the low-voltage motor/generator (electric machine) 30 described herein. The plurality of curves represent peak torques delivered to an axle of the driveline in relation to speed of the axle, and are associated with delivery of mechanical power from the electric machine 30 to the transmission 60, with the transmission 60 operating in one of a plurality of fixed-gear states and with the engine disconnect clutch 24 being deactivated. The embodiment of the transmission 60 is configured as a nine-speed fixed-gear transmission. The curves include a peak torque/speed relation in a first gear 511, a peak torque/speed relation in a second gear 512, a peak torque/speed relation in a third gear 513, a peak torque/speed relation in a fourth gear 514, a peak torque/speed relation in a fifth gear 515, a peak torque/speed relation in a sixth gear 516, a peak torque/speed relation in a seventh gear 517, a peak torque/speed relation in an eighth gear 518 and a peak torque/speed relation in a ninth gear 519. An acceleration line 520 is also shown, and indicates a maximum speed at which the vehicle can operate and achieve a desired vehicle acceleration with the torque being generated by the electric machine 30. The numerical value for the desired vehicle acceleration is calibratable based upon desired vehicle response characteristics. The intersections of the acceleration line 520 with the lines 511-516 indicates maximum vehicle speeds at which the electric machine 30 can operate to generate torque necessary to achieve the desired vehicle acceleration when the powertrain 100 is operating in the EV mode with the transmission 60 operating in the selected one of the first through sixth gears. The results shown in FIG. 5 indicate transmission gear-related maximum speeds at which the electric machine 30/420 is operating alone can achieve the desired vehicle acceleration, and thus indicates, for each of the transmission gears, the maximum speed at which the engine 10 can be disconnected from the powertrain system 100. The results also indicate that the engine 10 cannot be disconnected from the powertrain system 100 when the transmission 60 is operating in the seventh, eighth or ninth gears in this embodiment.

An acceptable response to a tip-in command is limited based upon the maximum power capacity of the electric machine 30. At high vehicle speeds, EV tip-in response might not be acceptable due to a resulting acceleration level that is less than a minimum threshold for the desired vehicle acceleration. The results shown in FIG. 5 indicate a plurality transmission gear-related maximum speeds at which the electric machine 30, operating alone, can achieve the desired vehicle acceleration, and thus indicates, for each of the transmission gears, the maximum speed at which the engine 10 can be disconnected from the powertrain system 100. This enables execution of an engine autostop operation to place the engine 10 in the OFF state, so long as the powertrain system 100 has the capacity to generate the desired vehicle acceleration in response to an engine tip-in event. Conversely, when the vehicle is operating in the EV mode, the calibration indicates a vehicle speed threshold for autostarting the engine 10.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A low-voltage hybrid powertrain system for a vehicle, comprising:

an internal combustion engine (engine), a torque converter, a low-voltage electric machine, a transmission and a controller;

wherein the engine includes a starting device;

wherein the torque converter is disposed between the engine and the input member of the transmission;

wherein the engine is selectively coupled via an engine disconnect clutch to an input member of the transmission, wherein the low-voltage electric machine is rotatably coupled to the input member of the transmission;

wherein the transmission includes an output member coupled to a driveline of the vehicle; and wherein the controller is operatively connected to the engine, the torque converter, and the low-voltage electric machine, the controller including an instruction set executable to:

operate the powertrain system in an electric vehicle (EV) mode with the engine in an OFF state and with the engine disconnect clutch in a deactivated state, monitor an output torque request, determine when the output torque request indicates a command for vehicle acceleration; and then:

control the low-voltage electric machine to generate torque that is transferred to the input member of the transmission in response to the output torque request, and simultaneously crank and start the engine via the starting device;

operate the engine in a speed control mode to activate the engine disconnect clutch;

determine that the engine disconnect clutch is activated; and control the engine and the low-voltage electric machine to generate torque in response to the output torque request when the engine disconnect clutch is activated.

2. The powertrain system of claim 1, wherein the engine disconnect clutch is a one-way clutch.

3. The powertrain system of claim 2, wherein the one-way clutch is a controllable one-way clutch.

4. The powertrain system of claim 1, wherein the low-voltage electric machine is an electric motor/generator that is electrically connected to an inverter that is electrically connected to a DC power source, wherein the DC power source is configured to operate at a voltage level that is less than 60 V DC.

5. The powertrain system of claim 1, wherein the engine is coupled via the engine disconnect clutch to a pump portion of the torque converter.

6. The powertrain system of claim 1, wherein the engine disconnect clutch comprises a one-way clutch that is disposed between the engine and the torque converter, wherein the low-voltage electric machine is rotatably coupled to the input member of the transmission via the torque converter, and wherein the instruction set is executable to determine that the engine disconnect clutch is activated when engine speed matches an input speed to the torque converter.

7. The powertrain system of claim 6, wherein the electric machine is rotatably coupled via an off-axis mechanical drive system to the input member of the transmission.

8. The powertrain system of claim 1, wherein the engine disconnect clutch comprises a one-way clutch that is disposed between the torque converter and the input member of the transmission, wherein the low-voltage electric machine is rotatably coupled to the input member of the transmission, and wherein the instruction set is executable to determine that the engine disconnect clutch is activated when engine speed matches an input speed to the torque converter.

9. The powertrain system of claim 8, wherein the electric machine is rotatably coupled via an off-axis mechanical drive system to the input member of the transmission.

10. The powertrain system of claim 1, wherein the instruction set is executable to control torque commands for the engine and the electric machine to generate torque in response to the output torque request.

11. The powertrain system of claim 1, wherein the instruction set is executable to monitor an operator input to an accelerator pedal to determine the output torque request.

12. The powertrain system of claim 1, wherein the instruction set is executable to monitor one of an adaptive cruise control system and an autonomous braking/collision avoidance system to determine the output torque request.

13. The powertrain system of claim 1, further comprising the instruction set executable to operate the powertrain system in the EV mode with the engine in the OFF state and with the engine disconnect clutch in the deactivated state only when the low-voltage electric machine has a mechanical power capacity that achieves an acceleration level that is greater than a minimum desired vehicle acceleration level.

14. A low-voltage hybrid powertrain system disposed to generate torque transferable to a vehicle driveline, comprising:
an internal combustion engine (engine), a low-voltage electric machine, a transmission and a controller;
wherein the engine is selectively coupled via an engine disconnect clutch to an input member of the transmission;
wherein the low-voltage electric machine is rotatably coupled to the input member of the transmission; and
wherein the controller is operatively connected to the engine and the low-voltage electric machine, the controller including an instruction set executable to:
operate the powertrain system in an electric vehicle (EV) mode with the engine in an OFF state and with the engine disconnect clutch in a deactivated state,
monitor an output torque request,
determine when the output torque request indicates a command for vehicle acceleration; and then:
control the low-voltage electric machine to generate torque that is transferred to the input member of the transmission in response to the output torque request, and simultaneously crank and start the engine;
operate the engine in a speed control mode to activate the engine disconnect clutch; and
control the engine and the low-voltage electric machine to generate torque in response to the output torque request when the engine disconnect clutch is activated.

15. The powertrain system of claim 14, further comprising the instruction set executable to operate the powertrain system in the EV mode with the engine in the OFF state and with the engine disconnect clutch in the deactivated state only when the low-voltage electric machine has a mechanical power capacity that achieves an acceleration level that is equal to or greater than a minimum desired vehicle acceleration level.

16. The powertrain system of claim 14, wherein the engine disconnect clutch is a one-way clutch.

17. A method for controlling operation of a low-voltage hybrid powertrain system for a vehicle, wherein the low-voltage hybrid powertrain system includes an engine that is selectively coupled via an engine disconnect clutch to an input member of a transmission and wherein the low-voltage electric machine is rotatably coupled to the input member of the transmission, the method comprising:
operating the powertrain system in an electric vehicle (EV) mode with the engine in an OFF state and with the engine disconnect clutch in a deactivated state;
monitoring an output torque request,
determining when the output torque request indicates a command for vehicle acceleration; and then:
controlling the low-voltage electric machine to generate torque that is transferred to the input member of the transmission in response to the output torque request, and simultaneously cranking and starting the engine;
operating the engine in a speed control mode to activate the engine disconnect clutch; and
controlling the engine and the low-voltage electric machine to generate torque in response to the output torque request when the engine disconnect clutch is activated.

18. The method of claim 17, further comprising operating the powertrain system in the EV mode with the engine in the OFF state and with the engine disconnect clutch in the deactivated state only when the low-voltage electric machine has a mechanical power capacity that achieves an acceleration level that is equal to or greater than a minimum desired vehicle acceleration level.

19. The method of claim 17, further comprising a torque converter being disposed between the engine and the engine disconnect clutch, wherein the torque converter include a clutch, and wherein the torque converter clutch is controlled in a closed state.

* * * * *